(12) United States Patent
Joyce et al.

(10) Patent No.: US 8,745,676 B2
(45) Date of Patent: Jun. 3, 2014

(54) ADMITTING A DATA FILE INTO A CHANNEL

(75) Inventors: Gerald R. Joyce, Newton, MA (US); Christopher W. Brown, Warrington, PA (US); Michael W. Patrick, Assonet, MA (US)

(73) Assignee: General Instrument Corporation, Horsham, PA (US)

( * ) Notice: Subject to any disclaimer, the term of this patent is extended or adjusted under 35 U.S.C. 154(b) by 1260 days.

(21) Appl. No.: 11/612,792

(22) Filed: Dec. 19, 2006

(65) Prior Publication Data
US 2008/0148324 A1 Jun. 19, 2008

(51) Int. Cl.
*H04N 7/173* (2011.01)

(52) U.S. Cl.
USPC .............................................. 725/94; 725/96

(58) Field of Classification Search
None
See application file for complete search history.

(56) References Cited

U.S. PATENT DOCUMENTS

| | | | |
|---|---|---|---|
| 6,040,866 A | | 3/2000 | Chen et al. |
| 6,055,270 A * | | 4/2000 | Ozkan et al. ............. 375/240.03 |
| 7,150,017 B1 * | | 12/2006 | Vogl et al. ....................... 718/102 |
| 7,418,007 B1 * | | 8/2008 | Liu et al. ........................ 370/468 |
| 7,505,480 B1 * | | 3/2009 | Zhang et al. ................... 370/465 |
| 7,533,405 B2 * | | 5/2009 | Kurauchi ........................ 725/95 |
| 7,571,246 B2 * | | 8/2009 | Virdi et al. ..................... 709/232 |
| 7,652,993 B2 * | | 1/2010 | van Beek ....................... 370/231 |
| 2003/0123540 A1 * | | 7/2003 | Zhong et al. .............. 375/240.07 |
| 2005/0021830 A1 * | | 1/2005 | Urzaiz et al. .................. 709/234 |
| 2005/0063461 A1 * | | 3/2005 | Lee et al. .................. 375/240.03 |
| 2005/0188407 A1 * | | 8/2005 | van Beek et al. ............... 725/81 |
| 2005/0246751 A1 * | | 11/2005 | Boyce et al. ................... 725/101 |
| 2005/0262261 A1 * | | 11/2005 | Deshpande .................... 709/231 |
| 2006/0095943 A1 * | | 5/2006 | Demircin et al. ................ 725/81 |
| 2006/0095944 A1 * | | 5/2006 | Demircin et al. ................ 725/81 |
| 2006/0165011 A1 * | | 7/2006 | Starr et al. ...................... 370/252 |
| 2006/0168632 A1 * | | 7/2006 | Honda et al. ..................... 725/95 |
| 2006/0230176 A1 * | | 10/2006 | Dacosta ........................ 709/235 |
| 2006/0233237 A1 * | | 10/2006 | Lu et al. .................. 375/240.03 |
| 2008/0212619 A1 * | | 9/2008 | Scott et al. ..................... 370/503 |

OTHER PUBLICATIONS

McManus, J., et al. "Video on Demand over ATM: Constant-Rate Transmission and Transport", IEEE INFOCOM, Mar. 1996.

* cited by examiner

*Primary Examiner* — Brian T Pendleton
*Assistant Examiner* — Ryan Stronczer
(74) *Attorney, Agent, or Firm* — Lori Anne D. Swanson

(57) ABSTRACT

In a method for admitting a new data file into a channel, a request for admission of the new data file into the channel is received. It is determined as to whether at least a minimum number of bits of at least one current data file has been transferred to the receiver. The rate at which the at least one current data file is transferred is reduced below a minimum constant bit rate in response to a determination that at least a minimum number of bits of the at least one current data file has been transferred to the receiver and the new data file is admitted into the channel.

20 Claims, 5 Drawing Sheets

ADMITTING A DATA FILE INTO A CHANNEL

FIELD

The present invention generally relates to content delivery, and more particularly to admitting content into a channel.

BACKGROUND

Recently, multiple system cable operators (MSOs) have been providing ever increasing numbers of variable bit-rate (VBR) video, particularly as on-demand high-definition content. The instantaneous bandwidth usage of the compressed VBR video scales with the varying complexity of the video content and thus, the VBR videos are typically transmitted in short, uneven spurts of data. For instance, high definition VBR videos can reach instantaneous rates approaching 16 Mbps for MPEG2 compression and 8 Mbps for MPEG4 Advanced Video Coding compression.

Due to the uneven bandwidth utilizations associated with transmission of VBR videos, it is often difficult for the MSOs to achieve a high average channel utilization for multiple VBR video flows. For instance, situations often arise where the total bandwidth for the multiple VBR video flows exceeds the capacity of the channel, which substantially limits the number of VBR video flows that can be transmitted over the channel. In addition, if the average of the sum of the instantaneous VBR video flows is close to the capacity of the channel, there may be unacceptable delays in some of the video packets, degrading the operation of the video decoders. A proposed solution is channel bonding, which increases bandwidth to improve statistical multiplexing of video flows; however, channel bonding is oftentimes prohibitively expensive to implement.

Attempts at maximizing the channel capacity have also led to capping of the amounts of bandwidth each of the multiple VBR video streams are allotted. Other attempts have led to encoding of the VBR videos at constant bit rates. While both of these options reduce the problem with statistical multiplexing, they also degrade the signal-to-noise ratio of the video and thus degrade its quality.

It would thus be beneficial to achieve a relatively high average channel usage in the transmission of multiple VBR videos, without suffering from the disadvantages associated with conventional VBR video transmission techniques.

SUMMARY

According to an embodiment, the present invention pertains to a method for admitting a new data file into a channel, which communicates at least one current data file from a communication network hub to a receiver at a rate equal to at least a minimum constant bit rate of the at least one current data file. In the method, a request for admission of the new data file into the channel is received. It is determined as to whether at least a minimum number of bits of the at least one current data file has been transferred to the receiver and the rate at which the at least one current data file is transferred is reduced below the minimum constant bit rate in response to a determination that at least a minimum number of bits of the at least one current data file has been transferred to the receiver. In addition, the new data file is admitted into the channel.

According to another embodiment, the present invention pertains to a communication network hub configured to deliver data files to a receiver across a channel. The communication network hub includes a database comprising a plurality of data files and a processor configured to transfer at least one of the plurality of data files across the channel to the receiver at a minimum constant bit rate. The processor is further configured to determine whether at least a minimum number of bits of the at least one of the plurality of data files has been transferred to the receiver when a request for admission of a new data file is received. The processor is further configured to reduce the rate at which the at least one of the plurality of data files is transferred to a level below the minimum constant bit rate in response to a determination that at least a minimum number of bits of the at least one of the plurality of data files has been transferred to the receiver. Moreover, the processor is further configured to admit the new data file into the channel.

According to a further embodiment, the present invention pertains to a computer readable storage medium on which is embedded one or more computer programs, said one or more computer programs implementing a method for admitting a new data file into a channel, which communicates at least one current data file from a communication network hub to a receiver at a rate equal to at least a minimum constant bit rate of the at least one current data file, the one or more computer programs comprising a set of instructions for: receiving a request for admission of the new data file into the channel; determining whether at least a minimum number of bits of the at least one current data file has been transferred to the receiver, wherein the minimum number of bits comprises a minimum number of bits of the at least one current data file transferred to the receiver that prevents the at least one current data file from being played back at a rate faster than the at least one current data file is stored in a buffer of the receiver when the rate at which the at least one current data file is transferred is reduced below the minimum constant bit rate; reducing the rate at which the at least one current data file is transferred below the minimum constant bit rate in response to a determination that at least a minimum number of bits of the at least one current data file has been transferred to the receiver; and admitting the new data file into the channel.

Through implementation of the systems and methods disclosed herein, data file transfers through a channel may substantially be optimized to thereby enable a substantially maximized number of data files to be transferred from a communication network hub, such as, a video on demand server, to a receiver, such as a set-top box. More particularly, the rate at which at least one of the data files is delivered is increased to thereby substantially increase the bandwidth available to transfer additional data files at a later time. In addition, because the data files are transferred as file transfers at minimum constant bit rates ($B_{CBR}$), the problems associated with statistical multiplexing are substantially obviated.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1A:
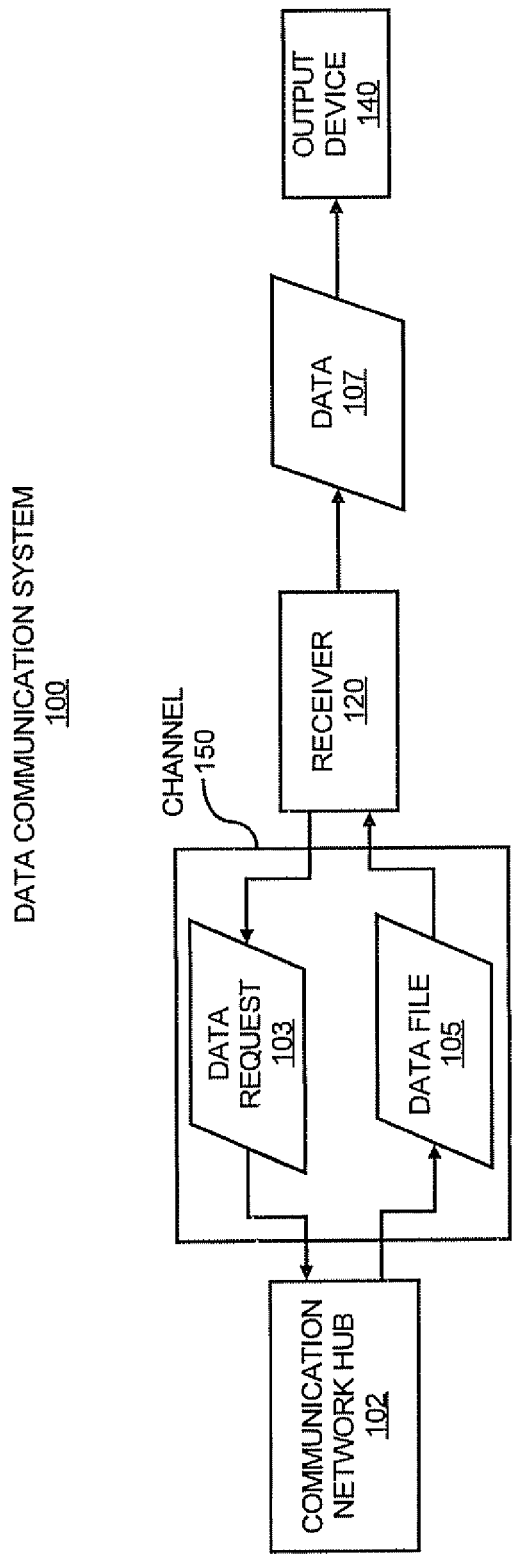
FIG. 1A illustrates a data flow path of a data communication system in which embodiments of the invention may be practiced.

With reference first to FIG. 1A, there is shown a data flow path of a data communication system 100 in which embodiments of the invention may be practiced, according to an example. It should be understood that the following description of the data communication system 100 is but one manner of a variety of different manners in which such a data communication system 100 may be configured and operated. In addition, it should be understood that the data communication system 100 may include additional components and that some of the components described may be removed and/or modified without departing from a scope of the data communication system 100.

Generally speaking, the data communication system 100 may comprise a video on demand (VOD) service that may be implemented to transmit selected video content to one or more users. As is generally known to those of ordinary skill in the art, VOD service may be defined as a service in which users are able to request and receive selected video content at desired times. In one regard, the VOD service may provide a unicast of the selected video content to a user because the user controls the time at which the selected video content is received.

The data communication system 100 is depicted in FIG. 1A as including a communication network hub 102, such as, a VOD server, or other type of computing device configured to transmit video data to a receiver 120. The receiver 120 may be connected to an output device 140, such as, a television, a computer monitor, or other type of display. The communication network hub 102 may be connected to the receiver 120 across a channel 150 through any reasonably suitable known connection, such as, for instance, one or more data over cable system interface specification (DOCSIS) channels over a hybrid-fiber-coax (HFC) plant, an MPEG2 transport stream, an MPEG4 transport stream, etc.

In one regard, bandwidth limitations exist in the channel 150 between the communication network hub 102 and the receiver 120, which may lead to inefficient data communication between the communication network hub 102 and the receiver 120. As discussed in greater detail herein below, the rates at which data files are communicated to the receiver 120 may be modified in various respects to improve the efficiencies in communicating data files from the communication network hub 102 to the receiver 120. More particularly, for instance, the rates at which one or more currently communicated data files are transferred may be decreased in order to admit a new data file into the channel 150, thereby substantially optimizing usage of the bandwidth available in the channel 150.

The receiver 120 generally includes any device that connects the output device 140 to an external source of signal and turns the signal into content that may be displayed on the output device 140. By way of example, the receiver 120 may comprise a set-top box for receiving signals from a local subscription cable company, a satellite service provider, such as, DISH NETWORK®, DIRECTV®, etc., or the like. In addition, or alternatively, the receiver 120 may comprise a component integral with the output device 140 configured to perform the functions of a set-top box.

Although a single communication network hub 102, a single receiver 120, and a single output device 140 have been depicted in FIG. 1A for purposes of simplicity, it should be understood that any reasonably suitable number of communication network hubs 102, receivers 120 and output devices 140 may be included in the data communication system 100 without departing from a scope of the invention. Thus, for instance, the communication network hub 102 may be configured to deliver data, such as, video files, to a plurality of different receivers 120. As another example, the receiver 120 may be configured to receive data from a plurality of communication network hub 102. In addition, data communicated between the communication network hub 102 and the receiver 120 may be relayed through any number of various components prior to being communicated to each other.

As depicted in FIG. 1A, the communication network hub 102 may receive a request for data 103 from the receiver 120. The request for data 103 may include, for instance, a request for a particular program, such as, a television show, a movie, a documentary, etc., or other type of data file, stored in the communication network hub 102. In response to receipt of the data request 103, the communication network hub 102 is configured to transmit a data file 105 associated with the request for data 103 to the receiver 120. The data file 105 may include, for instance, an MPEG file of a motion picture, a television program, a documentary, a music video, etc., or other type of data file, and may be in an encoded format.

The receiver 120 may decode the data file 105 and may display the decoded data 107 on the output device 140. Prior to decoding and displaying the data 107, the receiver 120 may store the data file 105 in a temporary storage to thereby provide a buffer between the downloading of the data file 105 and the playing of the data 107 on the output device 140.

As described in greater detail with respect to the following figures, the communication network hub 102 may track the bandwidth available in the channel 150, which may include, for instance, a DOCSIS channel, an MPEG2 transport stream, an MPEG4 transport stream, etc., between the communication network hub 102 and the receiver 120 and may vary the rate at which the data file 105 is communicated to the receiver 120 depending upon the available bandwidth. In one regard, the communication network hub 102 is configured to increase the rate at which the data file 105 is communicated if there is a sufficient amount of bandwidth available on the channel 150. Through increase of the communication rate, a larger portion of the data file 105 may be communicated in a relatively shorter period of time, thereby increasing the available bandwidth on the channel 150 at a later time. The additional bandwidth may be used, for instance, to admit a new data file 105 into the channel 150, thereby increasing the efficiency of the channel 150 bandwidth.

Figure 1B:
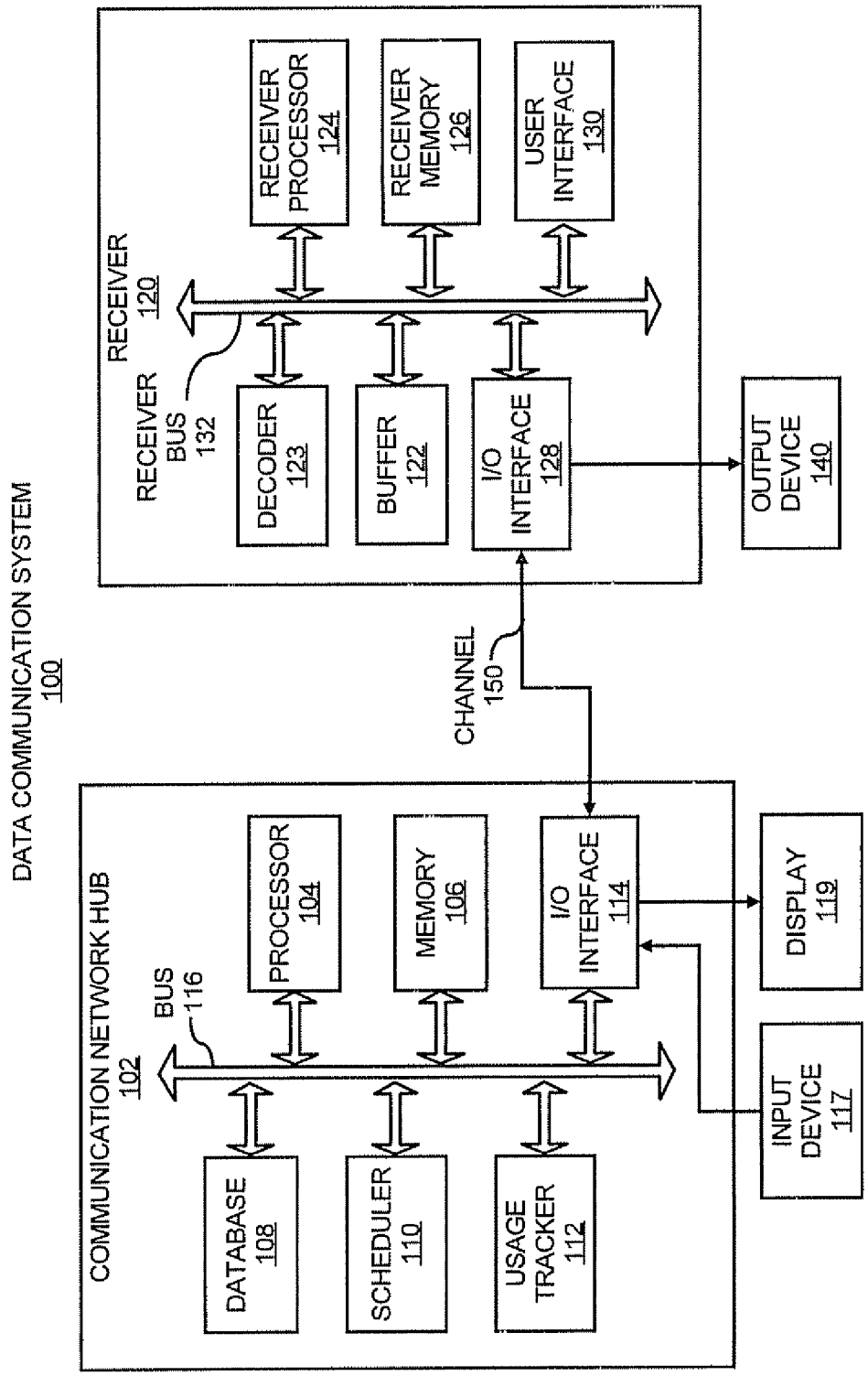
FIG. 1B illustrates a simplified block diagram of the data communication system of FIG. 1A, according to an embodiment of the invention.

With particular reference now to FIG. 1B, there is shown a simplified block diagram of the data communication system 100 of FIG. 1A, depicted in greater detail and according to an example. It should be understood that the following description of the data communication system 100 is but one manner of a variety of different manners in which such a data communication system 100 may be configured and operated. In addition, it should be understood that the data communication system 100 may include additional components and that some of the components described may be removed and/or modified without departing from a scope of the data communication system 100.

In FIG. 1B, the communication network hub 102 is depicted as including a processor 104, a memory 106, a database 108, a scheduler 110, a usage tracker 112, an input/output (I/O) interface 114, and a bus 116. The processor 104 is configured to perform various functions in the communication network hub 102, such as, to fulfill requests for video data files 105, to track locations of the data files 105, to vary the rates at which data files 105 are communicated to the receiver 120, etc. In this regard, the processor 104 may comprise a microprocessor, a micro-controller, an application specific integrated circuit (ASIC), and the like, configured to perform various processing functions.

The memory 106 is configured to provide storage of software, algorithms, and the like, that provide the functionality of the processor 104. By way of example, the memory 106 may store an operating system, application programs, program data, and the like. In this regard, the memory 106 may be implemented as a combination of volatile and non-volatile memory, such as DRAM, EEPROM, MRAM, flash memory, and the like. In addition, or alternatively, the memory 106 may comprise a device configured to read from and write to a removable media, such as, a floppy disk, a CD-ROM, a DVD-ROM, or other optical or magnetic media.

The database 108 may store a plurality of data files 105 in encoded or unencoded format. As discussed above, the communication network hub 102 may comprise a video on demand (VOD) server, which enables users to interact with the communication network hub 102 to thereby request and receive desired data files 105. Although the database 108 has been depicted as forming an element separate from the memory 106, it should be understood that the database 108 may form part of the memory 106 without departing from a scope of the invention.

In any regard, the database 108, or another database (not shown), may store additional information pertaining to the receiver 120 and the channel 150 between the communication network hub 102 and the receiver 120. For instance, the database 108 may store information pertaining to the size of the buffer 122 in the receiver 120, the programming which the receiver 120 is authorized to receive, the bandwidth available or allotted between the communication network hub 102 and the receiver 120 across the channel 150, etc. The communication network hub 102 may receive this information from the receiver 120 when the receiver 120 is initially activated and paired with the communication network hub 102 or this information may be received from the receiver 120 at various intervals of time.

The scheduler 110 is configured to indicate the timing and the rates at which various content are to be communicated to the receiver 120. More particularly, for instance, the scheduler 110 may indicate that particular programs stored in the database 108 are to be communicated to the receiver 120 at a particular time (t) according to, for instance, the programs the receiver 120 is authorized to receive. In this regard, the communication network hub 102 may be configured to communicate content in addition to VOD content, such as, regularly scheduled programming.

The scheduler 110 may also reserve respective bandwidths on the channel 150 for the data files 105 that are to be communicated to the receiver 120. For instance, the scheduler 110 is configured to schedule the total bandwidth usage in the channel 150 by one or more data file 105 flows at any given time. In addition, in order to preserve the bandwidth usages and to substantially avoid the problems associated with statistical multiplexing, the scheduler 110 is configured to schedule communication of the one or more data files 105 such that they are communicated at rates equal to at least minimum constant bit rates for each of the one or more data files 105. The minimum constant bit rates for each of the one or more data files 105 may comprise minimum constant bit rates required to prevent each of the one or more data files 105, which are being played back from the buffer 122 at rates faster than the one or more data files 105 are stored in the buffer 122, to cause the buffers to empty during playback. The scheduler 110 may calculate the minimum constant bit rates for each of the one or more data files 105 based upon a number of factors prior to transferring the data files 105 as discussed below.

As such, the scheduler 110 is further configured to calculate reserve minimum constant bit rates in the channel 150 for the communication of the one or more data files 105 such that they are transferred at sufficiently fast rates to enable the data 107 to be replayed without the buffer 122 emptying prematurely.

The usage tracker 112 is configured to track the amount of bandwidth being used by each of the data files 105 being communicated to the receiver 120 at a given time. The usage tracker 112 may also track additional information transmitted over the channel 150, such as, voice, data, IP multicast, etc.

Although the scheduler 110 and the usage tracker 112 have been depicted as separate elements, the scheduler 110 and the usage tracker 112 may comprise a single hardware or software component. Alternatively, either or both of the scheduler 110 and the usage tracker 112 may comprise software stored, for instance, in the memory 106, which are executable by the processor 104.

In any regard, the scheduler 110 is further configured to increase the rate at which at least one current data file 105 is transferred above the minimum constant bit rate for the at least one current data file 105, when there is sufficient bandwidth available for the increase. As such, additional content of the at least one current data file 105 may be transferred to the receiver 120 at an earlier time. The scheduler 110 may track the amount (for instance, in the number of bits) of additional content that has been transferred to the receiver 120. The scheduler 110 may additionally decrease the rate at which the at least one current data file 105 is transferred to thereby make additional bandwidth available for the admission of a new data file 105, as discussed in greater detail herein below.

A user may interface with the communication network hub 102 through an input device 117, such as, a keyboard, buttons, a mouse, a stylus, and the like. In addition, the user may receive information from the communication network hub 102 through a display 119. As shown, the input device 117 and the display 119 are in communication with the communication network hub 102 through the I/O interface 114.

In any regard, the processor 104 may invoke or implement the scheduler 110 and the usage tracker 112 in controlling the transfer of data files 105 stored in the database 108, such as, videos, images, sound, voice, data, etc., to the receiver 120. As shown, data is communicated between the various components of the communication network hub 102 through a bus 116, which may include, for instance, a circuit board having connections onto which each of the communication network hub components is attached. In addition, or alternatively, the bus 116 may include networking equipment into which some or all of the communication network hub components are connected.

The I/O interface 114 may comprise one or both of any reasonably suitable known hardware and software that facilitates communication of information between the communication network hub 102 and the receiver 120. In addition, the processor 104 may implement the I/O interface 114 to communicate with the receiver 120. The receiver 120 is depicted as also including an I/O interface 128 and may comprise one or both of any reasonably suitable known hardware and software that facilitates communication of information between the receiver 120 and the communication network hub 102.

The I/O interfaces 114 and 128 are configured to enable the communication network hub 102 and the receiver 120 to communicate through either a wired or a wireless connection.

The receiver 120 includes the buffer 122 and the I/O interface 128 as discussed above, and also includes a receiver processor 124, a receiver memory 126, a user interface 130, and a receiver bus 132. The receiver processor 124 is configured to perform various functions in the receiver 120, such as, to transmit requests for data files 103 to the communication network hub 102, to track the receipt of the data files 105 received and stored in the buffer 122, to decode encoded data files 105, to control playback of data 107 on the output device 140, etc. In one regard, the receiver processor 124 may comprise a microprocessor, a micro-controller, an application specific integrated circuit (ASIC), and the like, configured to perform the above-described and additional processing functions.

The receiver memory 126 is configured to provide storage of software, algorithms, and the like, that provide the functionality of the receiver processor 126. By way of example, the receiver memory 126 may store an operating system, application programs, program data, and the like. In this regard, the receiver memory 126 may be implemented as a combination of volatile and non-volatile memory, such as DRAM, EEPROM, MRAM, flash memory, and the like. In addition, or alternatively, the receiver memory 126 may comprise a device configured to read from and write to a removable media, such as, a floppy disk, a CD-ROM, a DVD-ROM, or other optical or magnetic media.

The buffer 122 is configured to store file data 105 communicated to the receiver 120 from the communication network hub 102 prior to playing the data 107 on the output device 140. In one regard, the buffer 122 may comprise a data storage device, such as, RAM, ROM, EPROM, EEPROM, magnetic or optical disks or tapes, a DVR (digital video recorder), etc. In addition, the buffer 122 may have sufficient capacity to enable storage thereon of at least a portion of the data file 105. In addition, the receiver processor 124 is configured to decode the data files 105 stored in the buffer 122 in order for the data files 105 to be in compliant form to be played back on the output device 140.

The user interface 130 generally provides users with the ability to control the receiver 120. For instance, the user interface 130 may enable users to control the receiver 120 to thereby manipulate the data 107 played on the output device 140, including, selection of the program to be viewed as well as control over the playback of the selected program. In this regard, the user interface 130 may comprise various controls placed on the receiver 120 or the user interface 130 may enable the receiver 120 to be connected with a remote device configured with the various controls.

As shown, the receiver processor 124 may receive signals from the user interface 130 through the receiver bus 132. The receiver bus 132 may include, for instance, a circuit board having connections onto which each of the components of the receiver 120 is attached. In addition, or alternatively, the receiver bus 132 may include networking equipment into which some or all of the components of the receiver 120 are connected.

The receiver processor 124 may also receive data communicated from the communication network hub 102 through the I/O interface 128 over the receiver bus 132. The data received from the communication network hub 102 may include, for instance, information pertaining to the data files 105 being communicated into the buffer 122. This information may include, for instance, the titles of the data files 105, one or more timestamps associated with the data files 105, etc.

In operation, because the data files 105 are stored in the buffer 122 prior to being played by the receiver 120, the playback time-base of the data 107 is decoupled from the transfer rate of the data files 105. In this regard, the data files 105 may be stored as variable bit rate (VBR) videos. However, the communication network hub 102 may transfer the VBR video data files 105 at constant bit rates (CBRs) because the playback of the data 107 and the transfer of the data files 105 are decoupled from each other.

Figure 2:
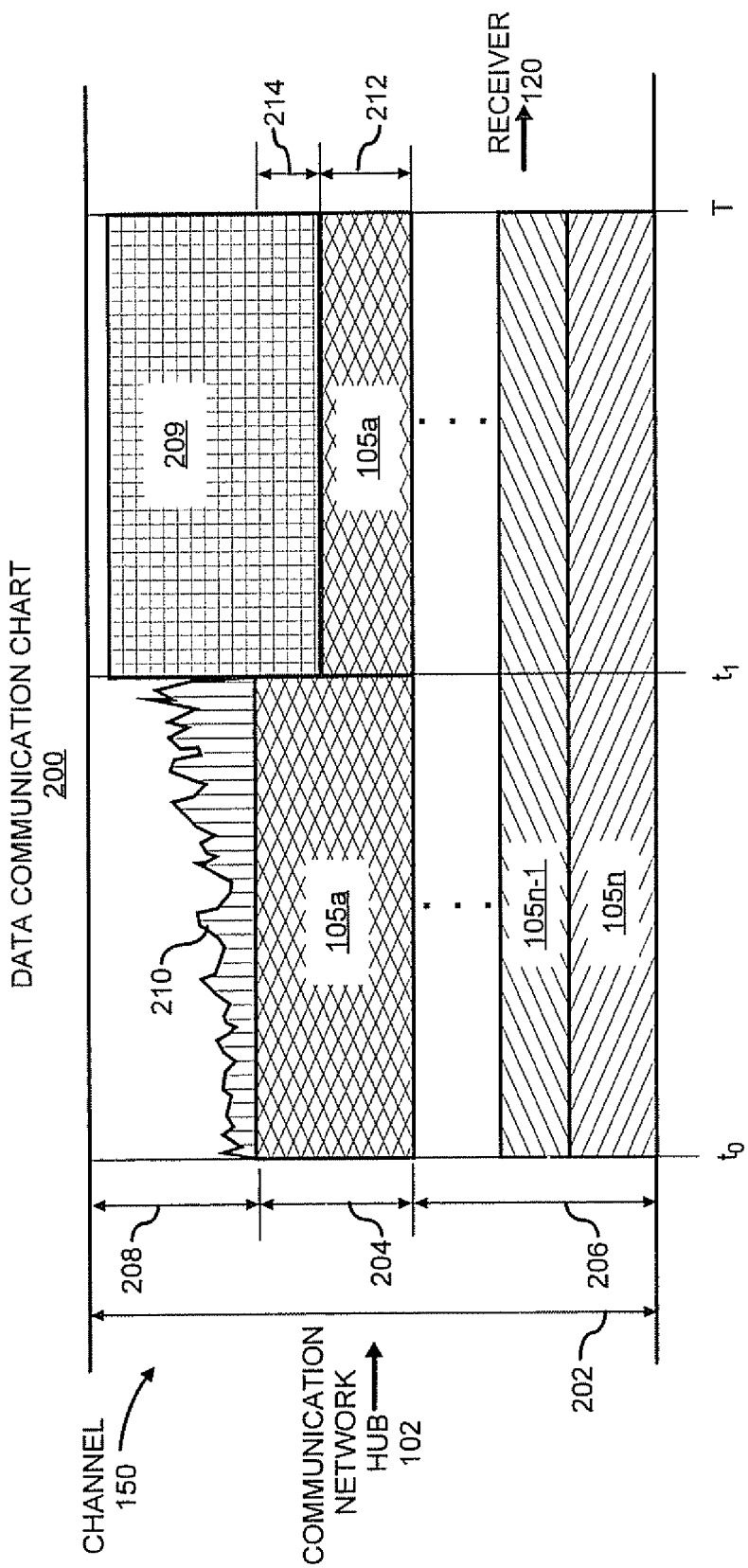
FIG. 2 illustrates a chart graphically depicting a manner in which a video data file is transferred through a channel, according to an embodiment of the invention.

According to an example, the processor 104 is configured to invoke or implement the scheduler 110 to manipulate the rates at which one or more data files 105 are transferred to the receiver 120. An example of a manner in which the processor 104 is configured to manipulate the transfer rate of the one or more data files 105 is described with respect to FIG. 2. FIG. 2 shows a chart 200, which graphically depicts a manner in which a data files 105 may be transferred through a channel 150, such as, a DOCSIS channel, an MPEG2 transport stream, an MPEG4 transport stream, etc.

As graphically shown in FIG. 2, the channel 150 has a total bandwidth ($B_{total}$) 202. At time $t_0$, a portion 204 of the total bandwidth ($B_{total}$) 202 is depicted as being used by a first data file 105a, and another portion 206 of the total bandwidth ($B_{total}$) 202 is depicted as being used by second through the nth data file 105b-105n. The portion 204 of the total bandwidth ($B_{total}$) 202 graphically illustrated as being used by the first data file 105a may be considered as the minimum constant bit rate ($B_{CBR\_1}$) for the first data file 105a. The portions 206 of the total bandwidth 202 that the remaining data files 105b-105n use may also be considered as respective minimum constant bit rates ($B_{CBR\_2}$-$B_{CBR\_N}$). In this regard, the channel 150 is capable of transferring all of the data files 105a-105n if the following equation is satisfied.

$$B_{CBR\_1}+B_{CBR\_2}+\ldots+B_{CBR\_N} \leq B_{total}. \quad \text{Equation (1):}$$

The minimum constant bit rates ($B_{CBR\_1}$-$B_{CBR\_N}$) may be set sufficiently high to enable the replay of the data files 105a-105n without causing the buffer 122 to empty prematurely. In addition, the minimum constant bit rates ($B_{CBR\_1}$-$B_{CBR\_N}$) of the data files 105a-105n may be calculated according to the following description. When the data files 105a-105n are transferred, the streams of the data files 105a-105n have sets of encoded elements, E(i), where each element E(i) has a decode time, DT(E(i)). Each element E(i) also has a transmission time TT(E(i)), where the transmission time is sufficiently fast to allow for transit delays from the communication network hub 102 to the receiver 120, as well as delays in the receiver 120 in decoding the encoded elements E(i), where the sum of the delays may be characterized as D. In this regard, the optimum value of the minimum constant bit rate ($B_{CBR\_1}$) for transferring a data file 105a is the minimum value of the transmission time TT(E(i)), such that:

$$TT(E(i))<DT(E(i))-D, \text{ for all } i. \quad \text{Equation (2):}$$

For any data file 105 and playback deadline D, the minimum constant bit rate $B_{CBR}$ may be calculated from Equation (2). In this regard, the total time ($T_d$) required to deliver a video data file 105 may be calculated according to:

$$T_d = \text{videofilesize}/B_{CBR} = \Sigma_{i=1}^{I} \text{Size}(E(i))/B_{CBR} \quad \text{Equation (3):}$$

With reference back to FIG. 2, oftentimes, the data files 105a-105n do not use all of the total bandwidth ($B_{total}$) 202. In these situations, there may be a certain amount of available bandwidth 208. Available bandwidth 208 may remain, for instance, because in many instances, it may be undesirable to transfer the data files 105a-105n in their entireties at relatively fast rates because the buffer 122 may be incapable of storing a large portion or the entire data files 105a-105n. As another example, even in instances where the buffer 122 is sufficiently large, such as when the buffer 122 comprises a DVR, it may be undesirable to transfer a large portion or the entire data files 105a-105n at relatively fast rates because the user may decide to not view the transferred data files 105a-105n, in which case, the transfer of the entire video data file 105 is unnecessary.

In any case, if the processor 104 determines that there is available bandwidth 208, the processor 104 may cause the transfer of at least one of the data files 105a-105n to "burst" above its minimum constant bit rate ($B_{CBR}$) as indicated by the striped portion 210, which indicates additional bits being transferred. In other words, the rate at which at least one of the data files 105a-105n, in this case, the first data file 105a, is transferred, is increased to a level above the minimum constant bit rate ($B_{CBR\_1}$) for that data file 105a when there is sufficient available bandwidth 208 for the increase.

As also shown in FIG. 2, prior to time ($t_1$), the channel 150 did not have sufficient available bandwidth 208 to admit a new data file 209. However, because the first data file 105a was transferred at a rate higher than the minimum constant bit rate ($B_{CBR\_1}$), after time ($t_1$), the minimum constant bit rate ($B_{CBR\_1}$) for the first data file 105a may be reduced as indicated by portion 212. As such, the available bandwidth to admit the new data file 209 has been increased by the portion 214. A manner in which the rates at which the data files 105a-105n may be modified to admit a new data file 209 is described in greater detail with respect to FIGS. 3 and 4.

Figure 3:
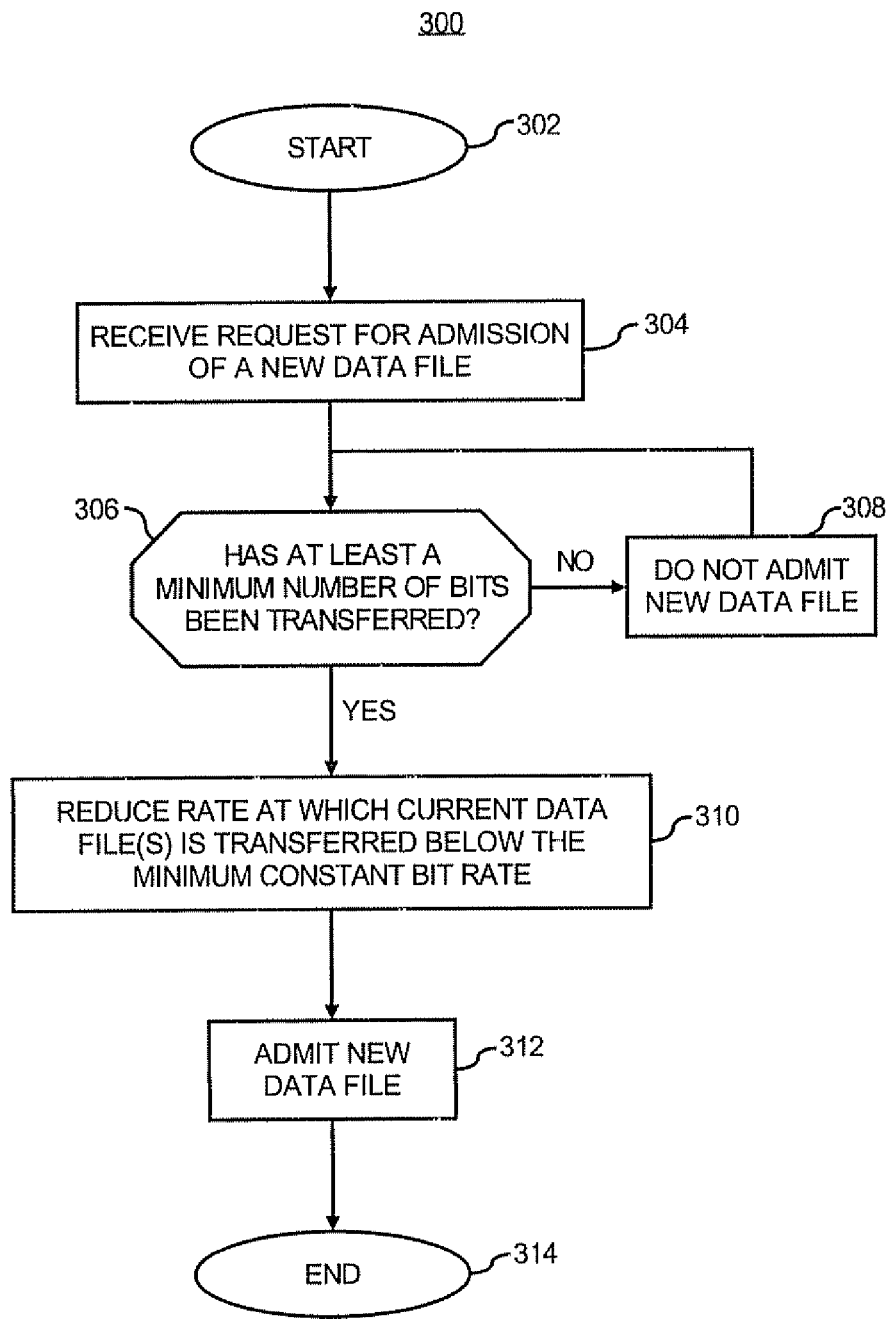
FIG. 3 illustrates a flow diagram of a method for admitting a new data file into a channel, according an embodiment of the invention.

With respect first to FIG. 3, there is shown a flow diagram of a method 300 for admitting a new data file 209 into a channel 150, according to an example. It is to be understood that the following description of the method 400 is but one manner of a variety of different manners in which examples of the data communication system 100 depicted in FIGS. 1A and 1B may be practiced. It should also be apparent to those of ordinary skill in the art that the method 300 represents a generalized illustration and that other steps may be added or existing steps may be removed, modified or rearranged without departing from a scope of the method 300.

The method 300 is described with respect to FIGS. 1A, 1B, and 2 by way of example and not of limitation. It will thus be apparent to one of ordinary skill in the art, that the method 300 may be performed with systems other than the data communication system 100 depicted in FIGS. 1A and 1B.

The processor 104 may initiate the method 300 at step 302 in response to any number of different stimuli. For instance, the processor 104 may initiate the method 300 when a request for admission of a new data file 209 is received, as indicated at step 304. As another example, the method 300 may be initiated according to an algorithm that the processor 104 is programmed to implement, such as, an algorithm configured to instruct the processor 104 to perform the method 300 at various intervals of time, for a number of iterations, at various times during a day, etc. In addition, or alternatively, the processor 104 may be programmed to initiate the method 300 upon startup of the communication network hub 102. As a further example, the processor 104 may manually be instructed by a user to initiate the method 300.

In any regard, once a request for admission of a new data file 209 is received at step 304, the processor 104 may determine whether at least a minimum number of bits of at least one data file 105a-105n have been transferred to the receiver 120 at step 306. More particularly, at step 306, the processor 104 may determine whether at least a minimum number of bits of at least one data file 105a-105n has been transferred to the receiver 120 to prevent the at least one data file 105a-105n from emptying out its buffer when the rate at which the at least one data file 105a-105n is transferred is reduced below the minimum constant bit rate for the at least one data file 105a-105n. The level to which the transfer rate of the at least one data file 105a-105n is required to be reduced may be based upon the minimum constant bit rate ($B_{CBR\_N\_+1}$) required for the new data file 209. Thus, for instance, the transfer rate of the at least one data file 105a-105n may be required to be reduced to a greater extent if the minimum constant bit rate ($B_{CBR\_N\_+1}$) required for the new data file 209 is relatively high.

If the processor 104 determines that at least a minimum number of bits of the at least one data file 105a-105n has not been transferred, the processor 104 may not admit the new data file 209 into the channel 150, as indicated at step 308. The processor 104, may continue to repeat steps 306 and 308 until the processor 104 determines that at least a minimum number of bits of at least one data file 105a-105n has been transferred.

If the processor 104 determines that at least a minimum number of bits of the at least one data file 105a-105n has been transferred at step 308, the processor 104 may reduce the rate at which the at least one data file 105a-105n is transferred to a level below the minimum constant bit rate ($B_{CBR}$) for the at least one data file 105a-105n, at step 310. The level to which the processor 104 reduces the transfer rate for the at least one data file 105a-105n may depend upon the number of additional bits 210 that were transferred during the "bursting" of the at least one data file 105a-105n, for instance, as depicted in FIG. 2. Thus, for instance, the processor 104 may reduce the transfer rate, or the minimum constant bit rate, for the at least one data file 105a-105n to a greater extent if a greater number of additional bits 210 is relatively high. In addition, the processor 104 may calculate a new minimum constant bit rate 212 for the at least one data file 105a-105n at time ($t_1$) based upon the number of additional bits 210 that have been transferred prior to time ($t_1$).

At step 312, the processor 104 may admit the new data file 209 into the channel at time ($t_1$). In one regard, the processor 104 may admit the new data file 209 into the channel because the minimum constant bit rate for the at least one data file 105a-105n has been reduced at time ($t_1$). In other words, the processor 104 may admit the new data file 209 because the sum of the minimum constant bit rates ($B_{CBR\_1}$-$B_{CBR\_N+1}$) for the data files 105a-105n and the new data file 209 may be less than the total bandwidth ($B_{total}$).

Following admission of the new data file 209, the method 300 may end, as indicated at step 314.

Through implementation of the method 300, for instance, the available bandwidth in the channel 150 may be increased by C amount 214 (measured, for instance, in bits per second), which is equivalent to the total number of bits 210 that exceeded the initial minimum constant bit rate ($B_{CBR}$) for the at least one data file 105a-105n between the times $t_0$ and $t_1$. As such, by increasing the rate at which the at least one data file 105a-105n is delivered to the receiver 120 during an earlier time period, the amount of bandwidth available for transferring the additional data file 209 at a later time period is substantially increased, thereby substantially optimizing the utilization of the bandwidth in the channel 150.

The reduction (R) in the amount of minimum constant bit rate ($B_{CBR}$) required to deliver the at least one data file 105a-105n may be calculated according to the following equation.

$$R = B_{CBR1}(t_0) - B_{CBR1}(t_1) = C/(T - t_1). \quad \text{Equation (4):}$$

In Equation (4), $B_{CBR\_1}(t_0)$ represents the minimum constant bit rate for delivery of the first data file 105a at time to, $B_{CBR\_1}(t_1)$ represents the minimum constant bit rate for delivery of the first data file 105a at time $t_1$, T represents the amount of time required to stream the first data file 105a, and C represents the number of additional bits 210 that was delivered ahead of schedule due to the bursting. Although FIGS. 2 and 3 have been depicted and described with respect to at least one data file 105a flow, the features of manipulating the minimum constant bit rates of the at least one data file 105a discussed above may be applied to any number of data files 105b-105n being delivered through the channel 150 at any given time. In this instance, the processor 104 may make a determination of which of the data files 105a-105 minimum constant bit rates are to be bursted and decreased. In one example, the processor 104 may make that determination according to which data file 105a-105n transfer rate increase yields the greatest amount of extra bandwidth in the channel 150 available for additional data files 209 to be delivered to the receiver 120. Preferably, the minimum constant bit rate for a current data file is a bit rate (e.g. a sufficiently high bit rate) which prevents the current data file from emptying from the buffer during playback. The minimum constant bit rate for a new data file is also preferably a minimum constant bit rate required to prevent the new data file from emptying out its portion of buffered content during playback from the buffer.

Figure 4:
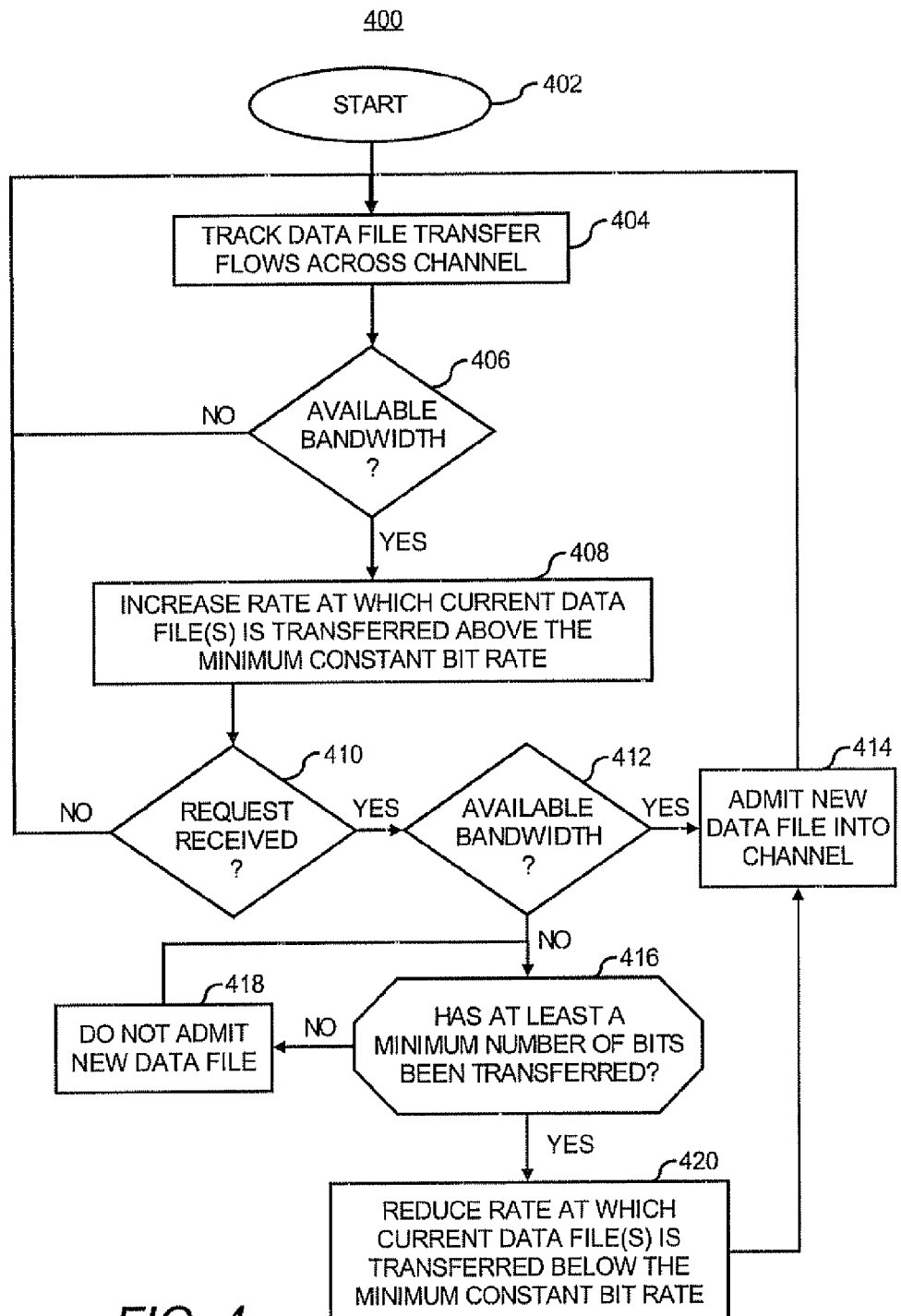
FIG. 4 illustrates a flow diagram of a method for admitting a new data file 209 into a channel, according to another embodiment of the invention.

With reference now to FIG. 4, there is shown a flow diagram of a method for admitting a new data file 209 into a channel, according to another example. It is to be understood that the following description of the method 400 is but one manner of a variety of different manners in which examples of the data communication system 100 depicted in FIGS. 1A and 1B may be practiced. It should also be apparent to those of ordinary skill in the art that the method 400 represents a generalized illustration and that other steps may be added or existing steps may be removed, modified or rearranged without departing from a scope of the method 400.

The method 400 is described with respect to FIGS. 1A, 1B, and 2 by way of example and not of limitation. It will thus be apparent to one of ordinary skill in the art, that the method 400 may be performed with systems other than the data communication system 100 depicted in FIGS. 1A and 1B.

The processor 104 may initiate the method 400 at step 402 in response to any number of different stimuli. For instance, the processor 104 may initiate the method 400 according to an algorithm that the processor 104 is programmed to implement, such as, an algorithm configured to instruct the processor 104 to perform the method 400 at various intervals of time, for a number of iterations, at various times during a day, etc. In addition, or alternatively, the processor 104 may be programmed to initiate the method 400 upon startup of the server 120. As a further example, the processor 104 may manually be instructed by a user to initiate the method 400.

Once initiated, the processor 104 may invoke or implement the usage tracker 112 to track the data file 105a-105n transfers across the channel 150, as indicated at step 404. The processor 104 may track the data file 105a-105n transfers based upon, for instance, the minimum constant bit rates ($B_{CBRi}$) for each of the data files (i) 105a-105n, as determined by the scheduler 110. Preferably, the minimum constant bit rate is a minimum constant bit rate which prevents the current data file from emptying from the buffer during playback.

At step 406, the processor 104 may determine whether there is any available bandwidth 208 in the channel 150. If there is no or insufficient available bandwidth 208, the processor 104 may continue to track the data file 105a-105n transfer across the channel at step 404. If, however, there is sufficient available bandwidth 208, the processor 105 may increase the rate at which at least one of the current data files 105a-105n is transferred to a level above the minimum constant bit rate ($B_{CBRi}$) for the at least one current data file 105a-105n, as indicated at step 408. The increase in transfer rate is graphically depicted in FIG. 2 as the number of additional bits 210.

At step 410, the processor 104 may determine whether a request for a new data file 209 has been received. If a request has not been received, the processor 104 may continue to track the data file 105a-105n transfers at step 404, and may repeat steps 404-410. However, if a request for a new video data 209 is received at step 410, the processor 104 may determine whether the channel 150 contains available bandwidth to admit the new video data 209, as indicated at step 412.

If the channel 150 contains sufficient available bandwidth 208 to admit the new data file 209, the processor 104 may admit the new data file 209, as indicated at step 414. If however, as indicated at step 416, the processor 104 determines that the channel 150 does not contain sufficient available bandwidth 208 to admit the new data file 209, the processor 104 may determine whether at least a minimum number of bits of at least one data file 105a-105n has been transferred at step 408. Step 416 is equivalent to step 306 (FIG. 3).

At step 416, if the processor 104 determines that at least a minimum number of bits of the at least one data file 105a-105n has not been transferred, the processor 104 may not admit the new data file 209 into the channel 150, as indicated at step 418. The processor 104, may continue to repeat steps 416 and 418 until the processor 104 determines that at least a minimum number of bits of at least one data file 105a-105n has been transferred.

If the processor 104 determines that at least a minimum number of bits of the at least one data file 105a-105n has been transferred at step 416, the processor 104 may reduce the rate at which the at least one data file 105a-105n is transferred to a level below the minimum constant bit rate ($B_{CBR}$) for the at least one data file 105a-105n, at step 420. Step 420 is equivalent to step 310 (FIG. 3). In addition, the processor 104 may admit the new data file 209 as indicated at step 414.

Although the method 400 may end following implementation of step 414, the method 400 may be performed on a substantially continuous basis starting with step 404 to substantially optimize the bandwidth usage in the channel 150.

One or more of the steps of the methods 300 and 400 and other steps described herein and software described herein may be implemented as software embedded or stored on a computer readable medium, such as the memory 106, and executed by the processor 104. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM, ROM, EPROM, EEPROM, and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

Through implementation of the systems and methods disclosed herein, data file transfers through a channel may substantially be optimized to thereby enable a substantially maximized number of data files to be transferred from a communication network hub, such as, a VOD server, to a receiver. More particularly, the bandwidth available to transfer additional data files is increased by substantially increasing the rate at which at least one of the data file streams is delivered. In addition, because the data files are transferred as file transfers at minimum constant bit rates ($B_{CBR}$), the problems associated with statistical multiplexing are substantially obviated.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method for admitting a new data file into a channel, said channel communicating at least one current data file from a communication network hub to a receiver at a rate equal to at least a minimum constant bit rate of the at least one current data file, said method comprising:
   receiving a request for admission of the new data file into the channel;
   determining whether at least a minimum number of bits of the at least one current data file has been transferred to the receiver;
   responsive to determining that at least the minimum number of bits of the at least one current data file has been transferred to the receiver, reducing the rate at which the at least one current data file is transferred, wherein the reduced rate is reduced to a rate:
      1) below the minimum constant bit rate, the minimum constant bit rate determined by dividing a size of the current data file by a time to transmit the current data file, and
      2) based on a second minimum constant bit rate associated with the new data file,
      3) so that a sum of the reduced rate and the second minimum constant bit rate is less than or equal to a bandwidth of the channel; and
   admitting the new data file into the channel.

2. The method according to claim 1, wherein the receiver comprises a buffer into which at least a portion of the at least one current data file is stored prior to being played back, and wherein the minimum constant bit rate comprises a minimum constant bit rate required to prevent the at least one current data file from emptying the buffer for that file during playback.

3. The method according to claim 2, wherein determining whether at least a minimum number of bits of the at least one current data file has been transferred to the receiver further comprises determining whether at least a minimum number of bits of the at least one current data file has been transferred to the receiver to prevent the at least one current data file from emptying the buffer for that file when the rate at which the at least one current data file is transferred is reduced below the minimum constant bit rate.

4. The method according to claim 2, wherein reducing the rate at which the at least one current data file is transferred further comprises reducing the rate at which the at least one current data file is transferred to a level that provides sufficient bandwidth in the channel to enable the new data file to be transferred at a rate equal to at least a minimum constant bit rate for the new data file, wherein the minimum constant bit rate for the new data file comprises a minimum constant bit rate required to prevent the new data file from emptying out its portion of buffered content during playback from the buffer.

5. The method according to claim 4, wherein the at least one current data file and the new data file include sets of encoded elements, the method further comprising:
   calculating the minimum constant bit rate for the at least one current data file and the minimum constant bit rate for the new data file based upon the time the receiver requires to decode the encoded elements, a period of time required to transmit the at least one current data file and the new data file which allows for transit delays, and delays in the receiver in decoding the encoded elements.

6. The method according to claim 2, wherein reducing the rate at which the at least one current data file is transferred further comprises reducing the rate at which the at least one current data file is transferred to a sufficiently high level that prevents the at least one current data file from emptying out its portion of buffered content during playback from the buffer.

7. The method according to claim 1, wherein determining whether at least a minimum number of bits of the at least one current data file has been transferred to the receiver further comprises determining whether at least a minimum number of bits of the at least one current data file has been transferred to the receiver at the time the request for admission of the new data file is received.

8. The method according to claim 1, further comprising:
   prior to receiving the request for admission of the new data file into the channel, increasing the rate at which the at least one current data file is transferred above the minimum constant rate when the channel has available bandwidth for the rate increase.

9. The method according to claim 1, further comprising:
   determining whether the channel comprises sufficient capacity to admit the new data file at the time the request for admission of the new data file is received; and
   wherein reducing the rate at which the at least one current data file is transferred further comprises reducing the rate at which the at least one current data file is transferred in response to a determination that the channel comprises insufficient capacity to admit the new data file.

10. The method according to claim 1, wherein the channel communicates a plurality of current data files from the communication network hub to the receiver, each of said plurality of current data files being transferred at rates equal to at least a minimum constant bit rate for each of the plurality of current data files, and wherein reducing the rate further comprises reducing the rates at which a plurality of the current data files are transferred below their respective minimum constant bit rates to admit the new data file.

11. The method according to claim 1, wherein the communication network hub comprises an on-demand server and the at least one current data file and the new data file comprise on-demand videos stored on the on-demand server.

12. A communication network hub configured to deliver data files to a receiver across a channel, said communication network hub comprising:
  a database comprising a plurality of data files;
  a processor configured to transfer at least one of the plurality of data files across the channel to the receiver at a minimum constant bit rate, wherein the processor is further configured to:
    determine whether at least a minimum number of bits of the at least one of the plurality of data files has been transferred to the receiver when a request for admission of a new data file is received,
    in response to a determination that at least a minimum number of bits of the at least one of the plurality of data files has been transferred to the receiver, reduce the rate at which the at least one of the plurality of data files is transferred, wherein the reduced rate is reduced to a rate:
      1) below the minimum constant bit rate, the minimum constant bit rate determined by dividing a size of the current data file by a time to transmit the current data file,
      2) based on a second minimum constant bit rate associated with the new data file
      3) so that a sum of the reduced rate and the second minimum constant bit rate being less than or equal to a bandwidth of the channel,
    admit the new data file into the channel.

13. The communication network hub according to claim 12, wherein the at least one receiver comprises a buffer into which at least a portion of the at least one of the plurality of data files is stored prior to being played back, and wherein the minimum constant bit rate comprises a minimum constant bit rate required to prevent the at least one of the plurality of data files from emptying out its portion of buffered content during playback from the buffer.

14. The communication network hub according to claim 13, wherein the processor is further configured to determine whether at least a minimum number of bits of the at least one of the plurality of data files has been transferred to the at least one receiver to prevent the at least one of the plurality of data files from emptying out its portion of buffered content during playback from the buffer when the rate at which the at least one plurality of data files is transferred is reduced below the minimum constant bit rate.

15. The communication network hub according to claim 13, wherein the processor is further configured to reduce the rate at which the at least one of the plurality of data files is transferred to a level that provides sufficient bandwidth in the channel to enable the new data file to be transferred at a rate equal to at least a minimum constant bit rate for the new data file, wherein the minimum constant bit rate for the new data file comprises a minimum constant bit rate required to prevent the new data file from emptying out its portion of buffered content during playback from the buffer.

16. The communication network hub according to claim 13, wherein the processor is further configured to reduce the rate at which the at least one current data file is transferred to a sufficiently high level that prevents the at least one current data file from being played back at a rate faster than the at least one current data file is stored in the buffer.

17. The communication network hub according to claim 12, wherein the processor is further configured to increase the rate at which the at least one of the plurality of data files is transferred above the minimum constant bit rate when the channel has available bandwidth for the rate increase.

18. The communication network hub according to claim 12, wherein the processor is further configured to determine whether the channel comprises sufficient capacity to admit the new data file at the time the request for admission of the new data file is received; and wherein the processor is further configured to reduce the rate at which the at least one of the plurality of data files is transferred in response to a determination that the channel comprises insufficient capacity to admit the new data file.

19. A non-transitory computer readable storage medium on which is embedded one or more computer programs, said one or more computer programs implementing a method for admitting a new data file into a channel, said channel communicating at least one current data file from a communication network hub to a receiver at a rate equal to at least a minimum constant bit rate of the at least one current data file, said one or more computer programs comprising a set of instructions for:
  receiving a request for admission of the new data file into the channel;
  determining whether at least a minimum number of bits of the at least one current data file has been transferred to the receiver, wherein the minimum number of bits comprises a minimum number of bits of the at least one current data file transferred to the receiver that prevents the at least one current data file from emptying out its portion of buffered content during playback from the buffer when the rate at which the at least one current data file is transferred is reduced below the minimum constant bit rate;
  reducing the rate at which the at least one current data file is transferred to a rate below the minimum constant bit rate in response to a determination that at least a minimum number of bits of the at least one current data file has been transferred to the receiver, the minimum constant bit rate determined by dividing a size of the current data file by a time to transmit the current data file , the time to transmit the current data file, the rate below the minimum constant bit rate based on a second minimum constant bit rate associated with the new data file so that a sum of the rate below the minimum constant bit rate and the second minimum constant bit rate being less than or equal to a bandwidth of the channel; and
  admitting the new data file into the channel.

20. The non-transitory computer readable medium according to claim 19, the set of instructions further comprising:
  determining whether the channel comprises sufficient capacity to admit the new data file at the time the request for admission of the new data file is received; and
  wherein reducing the rate at which the at least one current data file is transferred further comprises reducing the rate at which the at least one current data file is transferred in response to a determination that the channel comprises insufficient capacity to admit the new data file.

* * * * *